(12) United States Patent
Ross

(10) Patent No.: US 9,156,472 B2
(45) Date of Patent: Oct. 13, 2015

(54) ECONOMIC CRUISE CONTROL

(71) Applicant: Ford Global Technologies, LLC, Dearborn, MI (US)

(72) Inventor: Gunnar Robert Ross, Livonia, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 14/181,771

(22) Filed: Feb. 17, 2014

(65) Prior Publication Data

US 2014/0163798 A1 Jun. 12, 2014

Related U.S. Application Data

(63) Continuation of application No. 13/456,590, filed on Apr. 26, 2012, now Pat. No. 8,666,577.

(51) Int. Cl.
| | |
|---|---|
| *B60W 30/00* | (2006.01) |
| *B60W 10/06* | (2006.01) |
| *B60W 10/08* | (2006.01) |
| *B60W 10/10* | (2012.01) |
| *B60W 20/00* | (2006.01) |
| *B60K 6/445* | (2007.10) |
| *B60K 31/00* | (2006.01) |
| *B60W 10/105* | (2012.01) |
| *B60W 30/182* | (2012.01) |

(52) U.S. Cl.
CPC ............... *B60W 30/00* (2013.01); *B60K 6/445* (2013.01); *B60K 31/00* (2013.01); *B60W 10/06* (2013.01); *B60W 10/08* (2013.01); *B60W 10/10* (2013.01); *B60W 10/105* (2013.01); *B60W 20/00* (2013.01); *B60W 30/182* (2013.01); *B60K 2310/30* (2013.01); *Y02T 10/6239* (2013.01); *Y02T 10/6286* (2013.01); *Y10S 903/93* (2013.01)

(58) Field of Classification Search
CPC ..... B60W 30/00; B60W 10/06; B60W 10/08; B60W 10/10; B60W 20/20
USPC ......... 701/22, 93, 51; 180/65.1, 65.21, 65.28, 180/65.285; 903/903
See application file for complete search history.

(56) References Cited

U.S. PATENT DOCUMENTS

| | | | |
|---|---|---|---|
| 6,273,204 B1 | 8/2001 | Winner et al. | |
| 6,295,500 B1 | 9/2001 | Cullen et al. | |
| 6,304,809 B1* | 10/2001 | Cullen et al. | ............ 701/93 |
| 7,325,638 B1 | 2/2008 | Belloso | |
| 7,490,000 B2 | 2/2009 | Siddiqui et al. | |
| 2003/0085577 A1 | 5/2003 | Takaoka et al. | |
| 2008/0059035 A1 | 3/2008 | Siddiqui et al. | |
| 2009/0112416 A1 | 4/2009 | Heap et al. | |
| 2010/0204896 A1 | 8/2010 | Biondo et al. | |
| 2011/0166754 A1* | 7/2011 | Kolk et al. | ............ 701/54 |
| 2011/0276216 A1 | 11/2011 | Vaughan | |

FOREIGN PATENT DOCUMENTS

| | | |
|---|---|---|
| EP | 2460704 A1 | 6/2012 |
| WO | 2009109825 A1 | 9/2009 |

* cited by examiner

*Primary Examiner* — Mary Cheung
*Assistant Examiner* — Brian P Sweeney
(74) *Attorney, Agent, or Firm* — David B. Kelley; Brooks Kushman P.C.

(57) ABSTRACT

Economic cruise control where a response of a cruise control system used to control a powertrain is determined based at least in part on whether a driver of a vehicle system has selected to manage cruise control according to performance or efficient cruise control strategies. The performance strategy corresponding with fulfilling a request to accelerate or otherwise increase energy demands less efficiently, and in some cases more quickly, than if the request were to be fulfilled with the efficient cruise control strategy.

17 Claims, 3 Drawing Sheets

ECONOMIC CRUISE CONTROL

CROSS-REFERENCE TO RELATED APPLICATIONS

This application is a continuation of U.S. application Ser. No. 13/456,590 filed Apr. 26, 2012, now U.S. Pat. No. 8,666,577, the disclosure of which is hereby incorporated in its entirety by reference herein.

TECHNICAL FIELD

The present invention relates to vehicle cruise control of the type where a driver selects a desired vehicle speed and a vehicle controller attempts to automatically maintain the selected vehicle speed through corresponding control of a vehicle powertrain.

BACKGROUND

During operation of a vehicle, including a hybrid electric vehicle (HEV), plug-in hybrid electric vehicle (PHEV) and battery electric vehicle (BEV), when cruise control is engaged and the driver decides to accelerate, the vehicle may respond with a downshift and associated higher engine RPM to provide commanded acceleration. This can provide a relatively fast response but it may also be inefficient with respect to fuel economy. Drivers of electric or partially electric vehicles, in particular, tend to desire energy efficiency over performance, at least in some respects. The present invention contemplates allowing the driver to specify speed change preferences when operating in cruise control. It is believed that that this will enhance satisfaction of drivers that tend to desire efficiency over performance, at least during some operating conditions.

SUMMARY

One non-limiting aspect of the present invention relates to a method of controlling a powertrain of a vehicle comprising: determining an cruise-controlled acceleration request; determining a first acceleration action of the powertrain to meet the cruise-controlled acceleration request according to a first assist strategy; determining a second acceleration action of the powertrain to meet the cruise-controlled acceleration request according to a second assist strategy, the second assist strategy being slower and more efficient than the first assist strategy; determining driver selection of the first or second assist strategy; and controlling the powertrain to meet the cruise-controlled acceleration request according to the first acceleration action in the event the first assist strategy is selected and according to the second acceleration action in the event the second assist strategy is selected.

Embodiments include a method for controlling a vehicle having a battery powered traction motor comprising receiving a signal associated with a driver requested cruise control mode, accelerating the vehicle at a slower rate to attain a cruise control target speed when operating in a cruise control economy mode, and accelerating the vehicle at a faster rate to attain a cruise control target speed when operating in a cruise control performance mode. In one embodiment the method includes accelerating the vehicle at the slower rate by maintaining a current transmission gear ratio while accelerating the vehicle. In one embodiment, the vehicle includes an internal combustion engine powering the vehicle in the cruise control mode and the method includes accelerating the vehicle at the slower rate by increasing wheel torque by operating the battery powered traction motor to assist the internal combustion engine.

Various embodiments according to the present invention may include switching from the slower rate to the faster rate before attaining the cruise control target speed in response to an override event. Representative override events may include a signal generated in response to a cruise control request button being activated for a predefined period of time, and vehicle acceleration being below a corresponding threshold, for example.

In one embodiment, the vehicle includes an internal combustion engine powering the vehicle in the cruise control mode and accelerating the vehicle at the faster rate comprises downshifting a vehicle transmission.

Various embodiments according to the present invention may include a method of controlling a powertrain of a hybrid vehicle having an internal combustion engine, an electrically powered traction motor, and a transmission that includes controlling the engine, the traction motor, and the transmission in response to a cruise control acceleration request to selectively inhibit transmission downshifts for a current vehicle speed based on a selected one of a plurality of operating modes. The plurality of operating modes may include an efficiency mode, wherein the transmission downshifts are inhibited when the efficiency mode is selected. In embodiments where the plurality of operating modes includes an efficiency mode, controlling the engine, the traction motor, and the transmission may include accelerating the vehicle without increasing engine rotational speed when operating in the efficiency mode. In addition, the method may include accelerating the vehicle using the traction motor before using the engine or downshifting the transmission. In one embodiment, controlling the engine, the traction motor, and the transmission comprises accelerating the vehicle using electric energy provided by one of a high voltage battery and a fuel cell.

Non-limiting aspects of the invention may also include switching between the plurality of operating modes to increase acceleration in response to an override event, which may correspond to vehicle acceleration being below a corresponding threshold, for example. Other non-limiting aspects of the invention may include accelerating the vehicle using the engine when operating in an efficiency mode and stored electric energy for powering the traction motor is less than a corresponding threshold.

Various embodiments of the present invention include a vehicle having an electrically powered traction motor, a transmission, and a controller coupled to the traction motor and the transmission, the controller accelerating the vehicle at a slower rate to attain a cruise control target speed when operating in a first cruise control mode, and accelerating the vehicle at a faster rate to attain a cruise control target speed when operating in a second cruise control mode. The vehicle may also include an internal combustion engine coupled to the controller, wherein the controller accelerates the vehicle using the internal combustion engine when operating in the second cruise control mode. In one embodiment, the controller switches between the first cruise control mode and the second cruise control mode in response to a cruise control acceleration request when vehicle acceleration is below a corresponding threshold for a predetermined period of time. In one embodiment, the controller inhibits transmission downshifts when operating in the first cruise control mode. Embodiments include a vehicle having an internal combustion engine communicating with the controller, wherein the controller increases torque provided by the traction motor before increasing torque provided by the engine in response to a cruise control acceleration request.

One non-limiting aspect of the present invention relates to the first acceleration action downshifting the powertrain from a current gear to a lower gear and the second acceleration action maintains the current gear, thereby causing the second assist strategy to be slower and more efficient than the first assist strategy.

One non-limiting aspect of the present invention relates to the first acceleration action accelerating with assistance from an internal combustion engine and the second acceleration action includes accelerating solely with assistance from an electric motor, thereby causing the second assist strategy to be slower and more efficient than the first assist strategy.

One non-limiting aspect of the present invention relates to switching from the second assist strategy to the first assist strategy after beginning the second acceleration action and prior to satisfying the cruise-controlled acceleration request in the event an override event is determined.

One non-limiting aspect of the present invention relates to determining the override event in the event the driver depresses a cruise controller request button for a predefined period of time.

One non-limiting aspect of the present invention relates to determining the override event in the event acceleration after beginning the second acceleration action is slower than a predefined threshold.

One non-limiting aspect of the present invention relates to determining the override event in the event vehicle speed fails to increase after beginning the second acceleration action.

One non-limiting aspect of the present invention relates to method of controlling a powertrain of a vehicle comprising: determining a request for cruise-controlled acceleration; determining a first strategy for the powertrain to meet the request; determining a second strategy for the powertrain to meet the request that is more efficient than the first strategy; and controlling the powertrain according to a selected one of the first and second strategies.

One non-limiting aspect of the present invention relates to the first strategy shifting the powertrain from a current gear and the second strategy maintains the current gear.

One non-limiting aspect of the present invention relates to the first strategy accelerating with assistance from an internal combustion engine and the second strategy accelerating without assistance from the internal combustion engine.

One non-limiting aspect of the present invention relates to the second strategy accelerating with assistance from an electric motor.

One non-limiting aspect of the present invention relates to the second strategy accelerating with electric energy provided from one of a high voltage battery and fuel cell.

One non-limiting aspect of the present invention relates to switching from the second strategy to the first strategy in the event an override event is determined.

One non-limiting aspect of the present invention relates to the first strategy satisfying the request in less time than the second strategy would take to satisfy the request.

One non-limiting aspect of the present invention relates to selecting the first strategy in the event energy available from an electric storage source used to power acceleration of the powertrain is less than a predefined threshold.

One non-limiting aspect of the present invention relates to method of controlling a powertrain of a vehicle comprising: determining a request to increase vehicle speed using cruise control; determining a first strategy for the powertrain to meet the request; determining a second strategy for the powertrain to meet the request; and controlling the powertrain according to a driver selected one of the first and second strategies.

One non-limiting aspect of the present invention relates to the second strategy being more efficient than the first strategy.

One non-limiting aspect of the present invention relates to determining the driver selected one of the first and second strategies according to a driver input received in response to an inquiry requesting the driver to select between performance and efficient cruise control, the first strategy being selected in the event performance cruise control is the driver input and the second strategy being selected in the event efficient cruise control is the driver input.

One non-limiting aspect of the present invention relates to the first strategy downshifting the powertrain from a current gear and the second strategy maintains the current gear.

One non-limiting aspect of the present invention relates to the first strategy accelerating with assistance from an internal combustion engine and the second strategy includes accelerating without assistance from the internal combustion engine.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
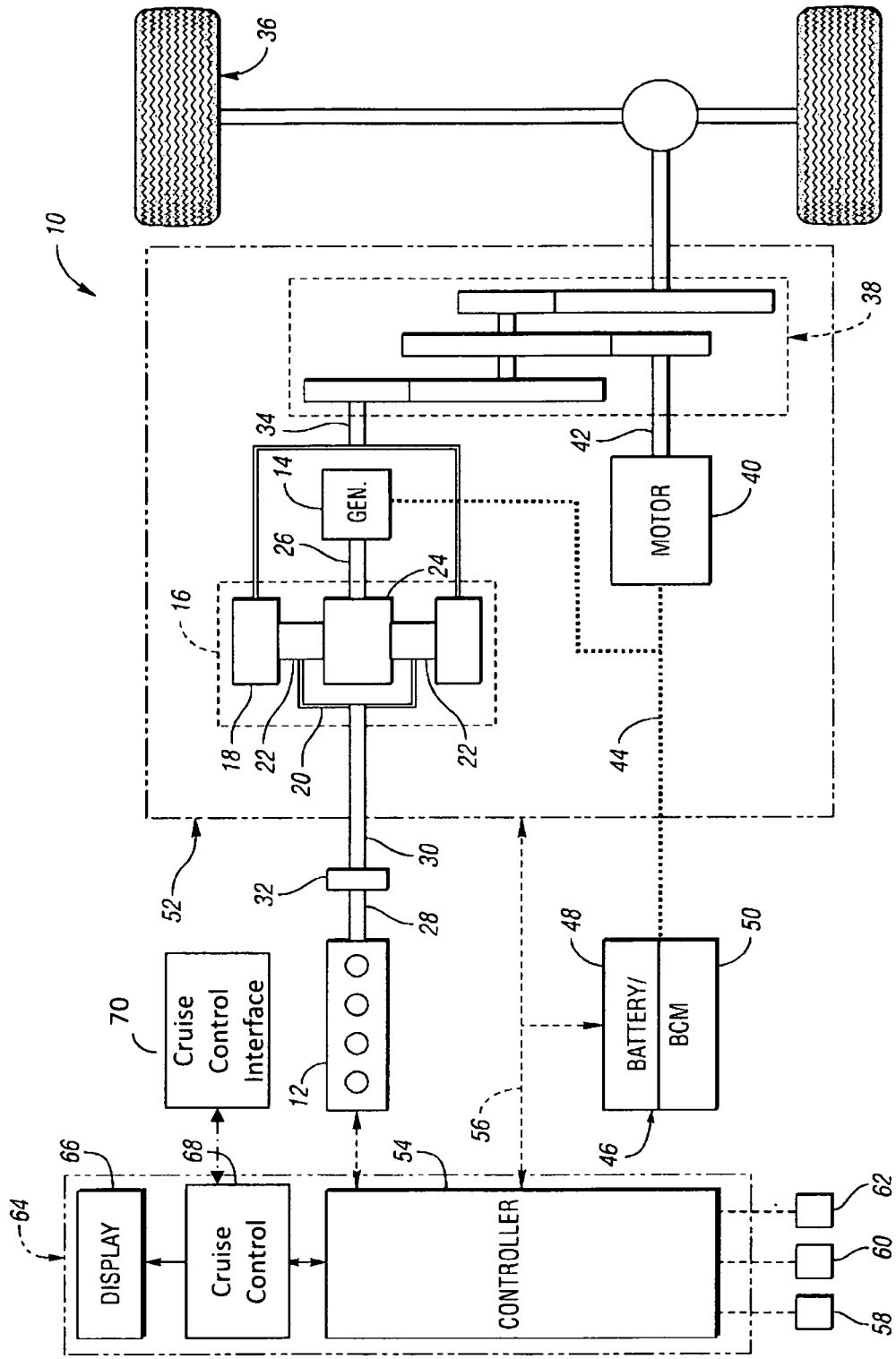
FIG. 1 schematic represents a vehicle controlled in accordance with one non-limiting aspect of the present invention.

Referring now to the drawings, FIG. 1 is a simplified, exemplary schematic representation of a vehicle 10 controlled in accordance with one non-limiting aspect of the present invention. The vehicle 10 may include an engine, such as an internal combustion engine (ICE) 12 and/or an electric machine, or generator 14. The engine 12 and the generator 14 may be connected through a power transfer arrangement, which for exemplary purposes is shown to be a planetary gear arrangement 16, as the present invention fully contemplates to use or incorporation of other types of power transfer arrangements, including but not limited to other gear sets and transmissions that connect the engine 12 to the generator 14. The planetary gear arrangement 16 is shown to include a ring gear 18, a carrier 20, planet gears 22, and a sun gear 24.

The generator 14 may be operable to output torque to a shaft 26 connected to the sun gear 24, in place or in additional to the engine 12, which may output torque to a crankshaft 28 connected to a shaft 30 through a passive clutch 32. The clutch 32 may provide protection against over-torque conditions. The shaft 30 may be connected to the carrier 20 of the planetary gear arrangement 16, and the ring gear 18 may be connected to a shaft 34, which may be connected to a first set of vehicle drive wheels, or primary drive wheels 36, through a gear set 38.

The vehicle 10 may include a second electric machine, or traction motor 40, which can be used to output torque to a shaft 42 connected to the gear set 38. Other vehicles within the scope of the present application may have different electric machine arrangements, such as more or fewer than two electric machines. The electric machine arrangement shown in FIG. 1 (i.e., the motor 40 and the generator 14) can both be used as motors to output torque. Alternatively, each can also be used as a generator, outputting electrical power to a high voltage bus 44 and to an energy storage system 46, which may include a battery 48 and a battery control module (BCM) 50.

The battery 48 may be a high voltage battery that is capable of outputting electrical power to operate the motor 40 and the generator 14. The BCM 50 may act as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52 (i.e., the generator 14 and motor 40) a vehicle control system, shown generally as vehicle controller 54, may be provided. Although it is shown as a single controller, it may include multiple controllers that may be used to control multiple vehicle systems. For example, the controller 54 may be a vehicle system controller/powertrain control module (VSC/PCM). In this regard, the PCM portion of the VSC/PCM may be software embedded within the VSC/PCM, or it can be a separate hardware device.

A controller area network (CAN) 56 may allow the controller 54 to communicate with the transmission 52 and the BCM 50. Just as the battery 48 includes a BCM 50, other devices controlled by the controller 54 may have their own controllers. For example, an engine control unit (ECU) may communicate with the controller 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a control system in accordance with the present application. Although illustrated and described in the context of the vehicle 10, which is a HEV, it is understood that embodiments of the present application may be implemented on other types of vehicles, such as those powered by an internal combustion engine alone, electric motor alone or a fuel cell.

Also shown in FIG. 1 are simplified schematic representations of a braking system 58, an accelerator pedal 60, and an air conditioning system 62. The braking system 58 may include such things as a brake pedal, position sensors, pressure sensors, or some combination of the two, as well as a mechanical connection to the vehicle wheels, such as the wheels 36, to effect friction braking. The braking system 58 may also include a regenerative braking system, wherein braking energy is captured and stored as electrical energy in the battery 48. Similarly, the accelerator pedal 60 may include one or more sensors, which, like the sensors in the braking system 58, may communicate with the controller 54. The air conditioning system 62 may also communicate with the controller 54. The on/off status of the air conditioning system can be communicated to the controller 54, and can be based on, for example, the status of an operator actuated switch, or the automatic control of the air conditioning system 62 based on related functions such as window defrost.

The vehicle 10 may include an information display system 64 operable to provide relevant vehicle content to the driver of the vehicle 10. The information display system may include the controller 54 and an information display 66. The information display system 64 may also include its own control system operable to communicate with the controller 54 and to perform control functions on the information display 66, although the controller 54 may also function as the information display's control system. The controller 54 may be configured to receive input that relates to current operating conditions of the vehicle 10, and the controller 54 may provide outputs such that the information display 66 conveys driving efficiency information or other information relating to the operation of the vehicle 10 to the driver.

The information display 66 may be disposed within a dashboard (not shown) of the vehicle 10, such as in an instrument panel or center console area. Moreover, the information display 66 may be part of another display system, such as a navigation display system, or may be part of a dedicated information display system. The information display 66 may be a liquid crystal display (LCD), a plasma display, an organic light emitting display (OLED), or any other suitable display. The information display 66 may include a touch screen for receiving driver input associated with selected areas of the information display 66. The information display system 64 may also include one or more buttons (not shown), including hard keys or soft keys, located adjacent the information display 66 for effectuating driver input. Driver input may include selection of a vehicle operating mode, such as a performance mode or an efficiency mode, for example. Other operator inputs known to one of ordinary skill in the art may also be employed without departing from the scope of the present application.

The vehicle may include a cruise control system 68 operable to control, direct, and/or request control, such as with assistance from the controller 54, to engage and otherwise control operation of the ICE, motor, and powertrain, including but not limited to controlling shifting operations of the powertrain/transmission 52 according to a desired operational strategy. One non-limiting aspect of the present invention contemplates the cruise control system 68 being operable to control the vehicle in cruise control mode where a desired vehicle speed is automatically maintained, e.g., without continuous driver interaction and/or manipulation of the accelerator pedal 60. The cruise control system 68 may include a cruise control interface 70 operable to set the desired vehicle speed and receive other inputs from the user associated with performing cruise control related functions, or in some cases a remote or wireless entity operable to control the vehicle.

A cruise control function contemplated by one non-limiting aspect of the present invention relates to cruise-controlled acceleration, which is generally defined to correspond with any type of vehicle event where the vehicle 10 is instructed while operating in cruise control mode to accelerate, change speed, or otherwise engage in some type of action that requires increased output from the engine and/or motor and/or increased consumption of energy, such as fuel from a fuel tank, fuel cell, battery, capacitor, etc. The cruise control controller 68 or other vehicle controller (e.g., 54) may be programmed or instructed with computer/processor executable instructions stored on a computer-readable medium to implement cruise-controller acceleration according to two or more control strategies, which may be based on one of a plurality of vehicle or cruise control operating modes. The present invention is predominately described for exemplary and non-limiting purpose with respect to two control strategies, referred to as a performance strategy and an efficiency strategy, although more strategies having different descriptions and purposes may be used. As described in greater detail herein, the use of a particular strategy may not necessarily correspond to the currently selected vehicle operating mode or driver selected strategy. For example, the performance strategy may be used in response to an override event even though the driver has selected an economy mode.

The performance strategy, at least in one non-limiting aspect of the present invention, is intended to correspond with cruise control based operations, e.g., operations controlled by the cruise control system, occurring in a manner that completes a requested acceleration or vehicle speed with greater performance than the same change would be achieved according to the efficiency strategy. The efficiency strategy, at least in accordance with one non-limiting aspect of the present invention, is intended to correspond with cruise control occurring in a manner that completes a requested acceleration or vehicle speed change more efficiently than the same change would be achieved according to the performance strategy manner. One differentiating characteristic of the performance strategy may be completion of the requested action in less time than the action would be completed according to the efficiency strategy, at least in so far as the efficiency strategy implementing actions that are less responsive and/or require more time for the purposes of consuming less fuel and/or in a manner that is otherwise more efficient.

Figure 2:
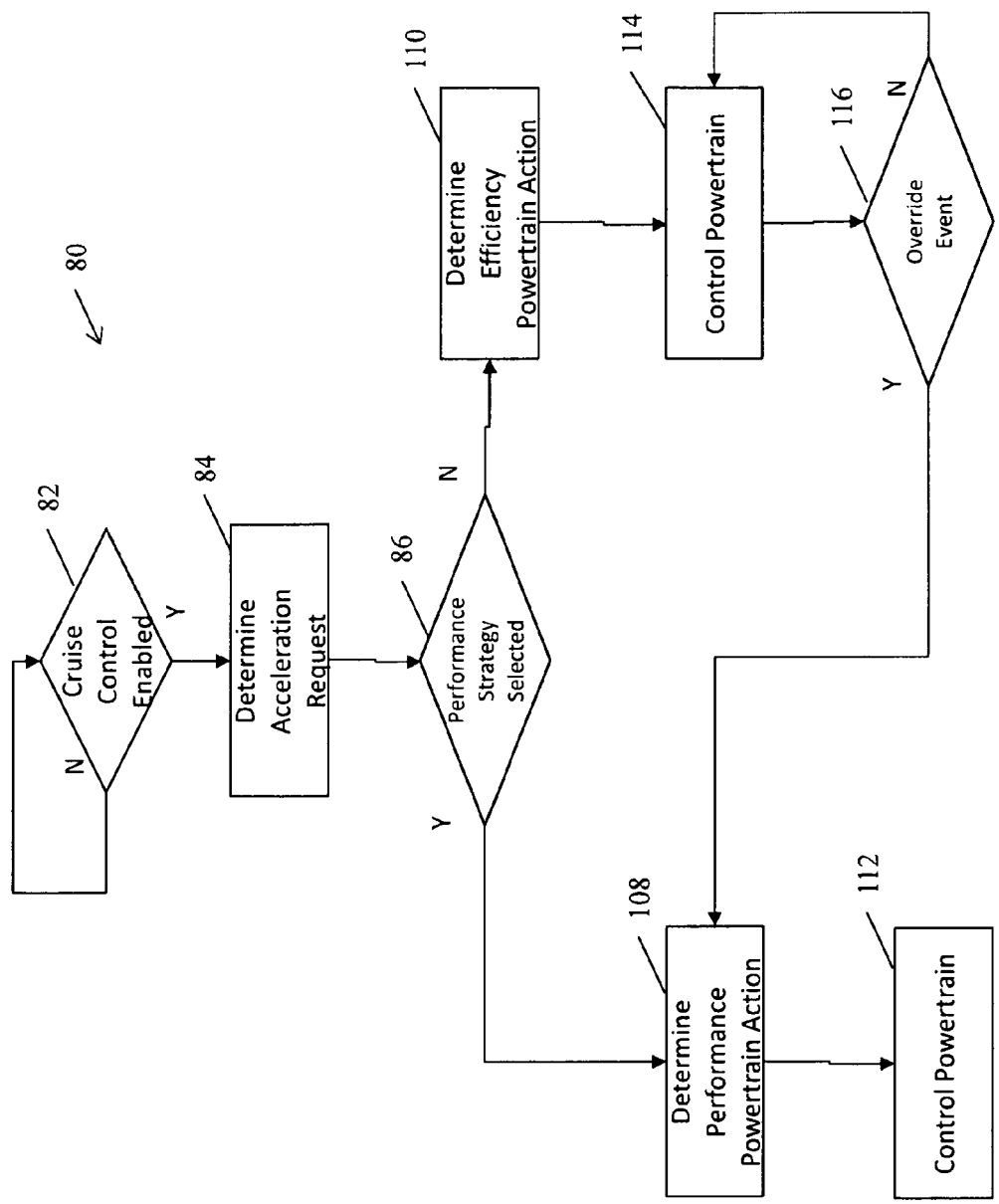
FIG. 2 illustrates a flowchart of a method for economic cruise control in accordance with one non-limiting aspect of the present invention.

FIG. 2 illustrates a flowchart 80 of a method for economic cruise control in accordance with one non-limiting aspect of the present invention. The method contemplates directing cruise control related operations according to one of the performance and efficiency related strategies noted above depending on desired operating parameters of the driver or an entity otherwise in control of managing the vehicle 10.

Block 82 relates to determining whether cruise control is enabled. Cruise control may be enabled through driver interaction with the cruise control system 68 and/or through remote means, such as if the vehicle is part of an automated transit system. The present invention contemplates cruise control relating to any automated control strategy where it is desirable to maintain a constant vehicle speed where the driver, or other entity, may periodically request an increase in the vehicle speed and/or where terrain changes (uphill) or other events may necessitate vehicle acceleration while the vehicle is being controller according to the cruise control mode. The events requiring the cruise control system 68 to take action are collectively are referred to as an acceleration request to simplify the exemplary description of the present invention.

Block 84 relates to determining occurrence of an acceleration request. The acceleration request may be determined, for example, when a driver depresses an acceleration button associated with the cruise control system, the driver verbally requesting acceleration through a vehicle verbal command system (not shown), and/or the cruise control system identifying operating conditions where automated control is required to maintain the current vehicle speed. The request may be defined according to any number of parameters, such as net increase in vehicle speed, a net increase in vehicle speed as a function of time, etc.

Block 86 relates to determining which one of the available cruise control strategies has been selected to control meeting the acceleration request. The available cruise control strategies may be dependent on the capabilities of the vehicle, such as whether the vehicle is driven solely using the ICE, such as if the vehicle does not include the motor and/or energy available for use by the motor is insufficient or unavailable, or using the ICE in combination with the electric motor or other secondary propulsion means. Threshold analysis and other calculations may be performed to assess the availability of the motor relative to available energy sources.

Figure 3:
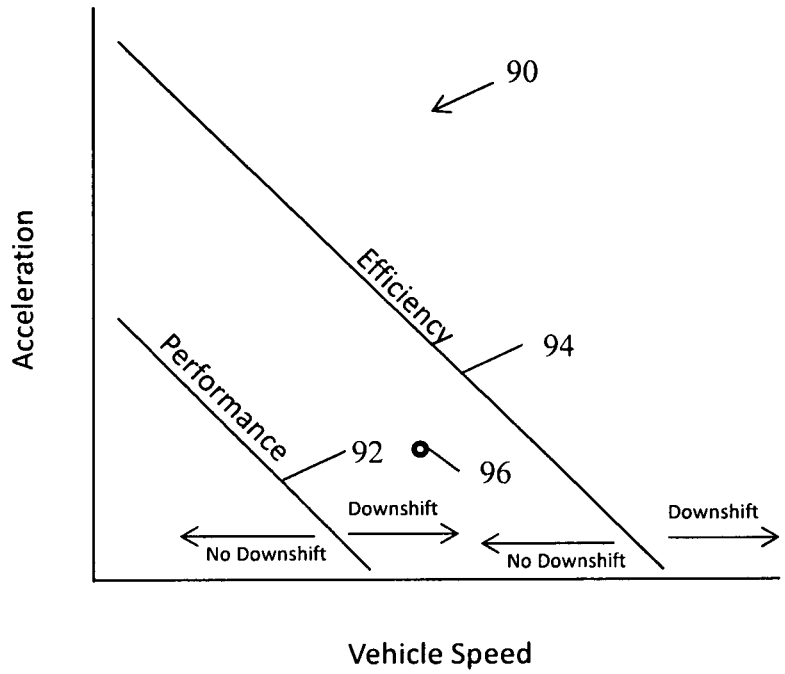
FIG. 3 illustrates a graph of operating strategies for the vehicle when assistance from the electric motor is unavailable in accordance with one non-limiting aspect of the present invention.

FIG. 3 illustrates a graph 90 of operating strategies for the vehicle 10 when assistance from the electric motor 40 is unavailable, for example, when the vehicle 10 is operating in ICE only mode. The graph 90 represents the performance strategy with a first line 92 and the efficiency strategy with a second line 94. The graph depicts one decision making process with respect to downshifting the transmission as a function of a current vehicle speed from a current gear to a lower gear in order to meet the requested acceleration demand. One differentiation between the performance and efficiency strategies when operating only using the ICE 12 relates to the performance strategy permitting downshifting before a corresponding downshifting would occur according to the efficiency strategy, thereby allowing the performance strategy to be more responsive at the cost of greater fuel consumption, i.e., lower efficiency.

The requested acceleration may be plotted versus the given vehicle speed and relative to one of the first and seconds lines 92, 94 to determine whether a downshift should occur. A reference value 96 is shown between the first and second lines 92, 94 to demonstrate an operating condition where downshifting would be permitted in the event the performance strategy was selected and where no downshifting would be permitted in the event the efficiency strategy was selected. The capability to select between the two strategies to control downshifting may be beneficial in allowing the vehicle 10 to perform more slowly, i.e., complete the acceleration request more slowly, or below its capabilities in order to conserve energy and/or fuel. While the lines are shown to be linear, the present invention fully contemplates the lines having other shapes and/or used to control other fuel/energy consuming decision besides downshifting.

Figure 4:
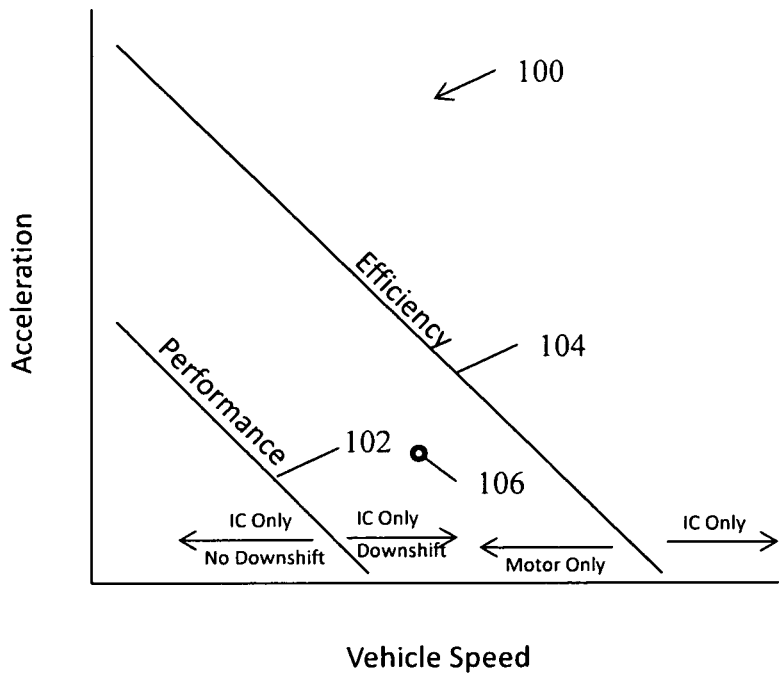
FIG. 4 illustrates a graph of operating strategies for the vehicle when the electric motor is available in accordance with one non-limiting aspect of the present invention.

FIG. 4 illustrate a graph 100 of operating strategies for the vehicle when the electric motor 40 is available to assist the ICE 12 in driving the vehicle. The graph 100 represents the performance strategy with a first line 102 and the efficiency strategy with a second line 104. The graph 100 depicts a decision making process regarding whether to engage the ICE 12 when attempting to provide the requested acceleration. One differentiation between these performance and efficiency strategies may include the performance strategy permitting use of the ICE 12 before a corresponding use would occur according to the efficiency strategy, thereby allowing the performance strategy to be more responsive at the cost of greater fuel consumption, i.e., lower efficiency.

The requested acceleration may be plotted versus the given vehicle speed and relative to one of the first and seconds lines 102, 104 to determine whether ICE only mode should occur. A reference value 106 is shown between the first and second lines 102, 104 to shown an operating condition where ICE only mode would be permitted in the event the performance strategy was selected and where motor only mode would be used in the event the efficiency strategy was selected. This capability to select between the two strategies to control motor usage may be beneficial in allowing the vehicle 10 to perform more slowly, i.e., complete the acceleration request more slowly, or below its capabilities in order to conserve energy and/or fuel. While the lines are shown to be linear, the present invention fully contemplates the lines having other shapes and/or used to control other fuel/energy consuming decision besides downshifting.

Optionally, in the event the ICE 12 is already engaged in assisting cruise control, such as if the ICE is assisting the electric motor 41, the decision making process shown in FIG. 4 may be used to determine whether further expenditures required to meet the request acceleration are to occur using the ICE 12 (IC only) or solely using the motor 40 (motor only). The ICE only of FIG. 4 may optionally include the ICE control of FIG. 3 in that the downshifting lines may be used to determine whether a downshift is permitted. This may be beneficial in further enhancing the driver's ability to select and control cruise control performance according to their desire for greater performance or greater efficiency.

Returning to FIG. 2, blocks 108, 110 relate to the cruise control system determining powertrain action to be implemented according to one of the performance and efficiency strategies selected above. Blocks 112, 114 relate to the cruise control system 68 issuing instructions to the vehicle controller 54 or otherwise directing the corresponding control of the powertrain. Block 116 is reached when operating according to the efficiency strategy and relates to a making an assessment of whether to switch from the currently active efficiency strategy to the performance strategy upon occurrence of an override event. The override event may correspond with an action in response to which it may be desirable to cease operating at the lower performance of the efficiency strategy. The thresholds and/or conditions used to assess this need may be specified by the driver or other controlling entity.

One override event may be determined in the event the driver depresses a cruise controller request button for a pre-defined period of time sufficient to differentiate between a desire to slowly or rapidly acceleration, e.g., a depression of longer than three seconds may be considered as desire to accelerate more rapidly. A similar override event may occur with a particular depression sequence of the button, such as if the button is pulsed or otherwise repeatedly actuated in a discernable manner understood by the driver to automatically prompt selection of the performance strategy. Another override event may be determined in the event change acceleration after beginning is slower than a predefined threshold, e.g. there may be limit, optionally specified by the driver, for how slowly the efficiency mode may accelerate before automatically switching to the performance strategy, e.g., change of speed less than one mile per five seconds may be set as the slowest allowable acceleration before switching to the performance strategy. Yet another override event may occur in the event vehicle speed fails to increase after beginning the efficiency controlled acceleration, such as if the motor lacks sufficient power or torque to increase vehicle speed, which may occur, for example, in the event the vehicle is traveling a sufficiently inclined surface.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of operating a vehicle having first and second cruise control modes in which requested acceleration to a target speed is greater in the first mode than in the second mode, the method comprising:
    commanding, by a controller, a transition to the first cruise control mode in response to vehicle acceleration being less than a predetermined threshold for a predetermined period of time during an acceleration request while in the second cruise control mode.

2. The method of claim 1 further comprising commanding, by the controller, an engine to accelerate the vehicle in the first cruise control mode.

3. The method of claim 1 further comprising commanding, by the controller, a traction motor to accelerate the vehicle in the first cruise control mode.

4. The method of claim 1 further comprising commanding, by the controller, a transmission to downshift while accelerating the vehicle in the first cruise control mode.

5. The method of claim 1 wherein the first cruise control mode is a cruise control performance mode and the second cruise control mode is a cruise control economy mode.

6. A vehicle comprising:
    a transmission; and
    at least one controller programmed to inhibit transmission downshifts when operating in a first cruise control mode and allow transmission downshifts when operating in a second cruise control mode, and in response to vehicle acceleration being less than a predetermined threshold for a predetermined period of time during an acceleration request while in the first cruise control mode, transition to the second cruise control mode to allow transmission downshifts.

7. The vehicle of claim 6 wherein the transmission is downshifted in the second cruise control mode to increase vehicle acceleration.

8. The vehicle of claim 6 further comprising an engine, and wherein the at least one controller is further programmed to accelerate the vehicle using the engine before downshifting the transmission in the second cruise control mode.

9. The vehicle of claim 6 further comprising a traction motor, and wherein the at least one controller is further programmed to accelerate the vehicle using the traction motor before downshifting the transmission in the second cruise control mode.

10. A vehicle comprising:
    an engine;
    a traction motor; and
    at least one controller programmed to accelerate the vehicle using at least one of the traction motor and the engine in a first cruise control mode at a faster rate than in a second cruise control mode, and in response to vehicle acceleration being less than a predetermined threshold for a predetermined period of time during an acceleration request while in the second cruise control mode, transition to the first cruise control mode to increase vehicle acceleration.

11. The vehicle of claim 10 wherein the first cruise control mode is a cruise control performance mode and the second cruise control mode is a cruise control economy mode.

12. The vehicle of claim 10 wherein the at least one controller is further programmed to transition from the second cruise control mode to the first cruise control mode in response to vehicle speed not increasing within a predetermined time after the acceleration request.

13. The vehicle of claim 10 further comprising a transmission, and wherein the at least one controller is further programmed to downshift the transmission in the first cruise control mode.

14. The vehicle of claim 10 further comprising a transmission, and wherein the at least one controller is further programmed to accelerate the vehicle using the traction motor before downshifting the transmission in the first cruise control mode.

15. The vehicle of claim 10 further comprising a transmission, and wherein the at least one controller is further programmed to accelerate the vehicle using the engine before downshifting the transmission in the first cruise control mode.

16. The vehicle of claim 10 further comprising a transmission, and wherein the at least one controller is further programmed to select between using the engine and downshifting the transmission to accelerate the vehicle based on vehicle speed in the first cruise control mode.

17. The vehicle of claim 10 further comprising a transmission, and wherein the at least one controller is further programmed to downshift the transmission to accelerate the vehicle in the first cruise control mode.

\* \* \* \* \*